(12) United States Patent
Cronin et al.

(10) Patent No.: US 7,379,839 B2
(45) Date of Patent: *May 27, 2008

(54) MULTI-FUNCTION AIR DATA PROBES EMPLOYING NEURAL NETWORKS FOR DETERMINING LOCAL AIR DATA PARAMETERS

(75) Inventors: Dennis J. Cronin, Shakopee, MN (US); Karl G. Drutowski, Inver Grove Heights, MN (US); Andrew P. Mack, Minneapolis, MN (US)

(73) Assignee: Rosemount Aerospace, Inc., Burnsville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/328,487

(22) Filed: Dec. 23, 2002
(Under 37 CFR 1.47)

(65) Prior Publication Data

US 2004/0122615 A1 Jun. 24, 2004

(51) Int. Cl.
*G01L 7/00* (2006.01)
(52) U.S. Cl. ................................... 702/138
(58) Field of Classification Search ............ 702/138, 702/144, 150; 73/170.02, 170.05, 180, 182, 73/861.66, 861.65; 701/5, 6, 7, 14, 220; 706/17, 21

See application file for complete search history.

(56) References Cited

U.S. PATENT DOCUMENTS

| 3,318,146 A | 5/1967 | DeLeo et al. ............. 73/180 |
| 4,096,744 A | 6/1978 | DeLeo et al. ............. 73/180 |
| 4,303,978 A | 12/1981 | Shaw et al. ............. 364/453 |
| 4,378,696 A | 4/1983 | DeLeo et al. ............. 73/180 |
| 4,378,697 A | 4/1983 | DeLeo et al. ............. 73/182 |
| 4,615,213 A | 10/1986 | Hagen ................... 73/180 |
| 4,644,538 A | 2/1987 | Cooper et al. ............ 371/9 |
| 4,836,019 A | 6/1989 | Hagen ................... 73/180 |
| 4,987,542 A | 1/1991 | Tran ................. 364/424.05 |
| 5,205,169 A | 4/1993 | Hagen ................... 73/180 |
| 5,319,970 A | 6/1994 | Peterson et al. ........... 73/182 |
| 5,369,993 A | 12/1994 | Hagan ................. 73/178 R |

(Continued)

FOREIGN PATENT DOCUMENTS

DE 37 27 906 3/1989

(Continued)

OTHER PUBLICATIONS

"BFGoodrich-Aircraft Sensors Division Air Data System with SmartProbe for Fairchiled Dornier 728JET", BFGoodrich-Rosemount Aerospace, Addendum to D9820217 Rev. B, Oct. 1998, pp. 1-10.

(Continued)

*Primary Examiner*—John Barlow
*Assistant Examiner*—Stephen J. Cherry
(74) *Attorney, Agent, or Firm*—Westman, Champlin & Kelly

(57) ABSTRACT

An air data sensing probe or MFP includes a barrel having multiple pressure sensing ports for sensing multiple pressures. Instrumentation coupled to the pressure sensing ports provides electrical signals related to the multiple pressures. A neural network, coupled to the instrumentation, receives as inputs the electrical signals related to the multiple pressures, and in response, the neural network provides, as an output, electrical signals indicative of at least one local air data parameter for the air data sensing probe.

25 Claims, 7 Drawing Sheets

U.S. PATENT DOCUMENTS

| | | | |
|---|---|---|---|
| 5,423,209 A | 6/1995 | Nakaya et al. | 73/182 |
| 5,485,412 A | 1/1996 | Sarkkinen et al. | 364/724.05 |
| 5,610,845 A | 3/1997 | Slabiniski et al. | 364/565 |
| 5,616,861 A | 4/1997 | Hagan | 73/180 |
| 5,710,559 A | 1/1998 | Krogmann | 340/963 |
| 5,797,105 A * | 8/1998 | Nakaya et al. | 701/7 |
| 5,819,188 A | 10/1998 | Vos | 70/4 |
| 5,901,272 A * | 5/1999 | Schaefer et al. | 706/17 |
| 6,073,084 A | 6/2000 | Le Tron | 702/94 |
| 6,253,166 B1 * | 6/2001 | Whitmore et al. | 703/2 |
| 6,305,218 B1 | 10/2001 | Foster | 73/178 R |
| 6,466,888 B1 * | 10/2002 | McCool et al. | 702/144 |
| 6,561,020 B2 * | 5/2003 | Glenney | 73/170.02 |
| 6,594,559 B2 | 7/2003 | Alwin et al. | 701/14 |
| 6,604,029 B2 * | 8/2003 | Cronin et al. | 701/6 |
| 6,609,421 B2 * | 8/2003 | Cronin et al. | 73/170.02 |
| 6,668,640 B1 | 12/2003 | Alwin et al. | 73/170.02 |
| 6,761,057 B2 | 7/2004 | Cronin et al. | 73/1.78 |
| 2004/0122615 A1 | 6/2004 | Cronin et al. | 702/138 |
| 2006/0155506 A1 | 7/2006 | Cronin et al. | 702/138 |
| 2006/0212181 A1 | 9/2006 | Cronin et al. | 701/3 |
| 2006/0225496 A1 | 10/2006 | Cronin et al. | 73/170.02 |

FOREIGN PATENT DOCUMENTS

| | | |
|---|---|---|
| DE | 44 10 709 A1 | 10/1995 |
| EP | 1 256 811 A2 | 11/2002 |
| EP | 1 293 784 | 3/2003 |
| GB | 1176381 | 1/1970 |
| RU | 2 041 136 C1 | 8/1995 |
| RU | 2 103 718 C1 | 1/1998 |
| WO | WO 99/32963 | 7/1999 |

OTHER PUBLICATIONS

"SmartProbe™ Air Data System for Embraer ERJ-170 & 190", BFGoodrich-Aircraft Sensors Division, Proposal D9920133, Apr. 1999, pp. 1-65.

F.W. Hagen and Dr. H. Seidel, "Deutsche Airbus Flight Test of Rosemount Smart Probe for Distributed Air Data System", IEEE Aerospace and Electronic Systems Magazine, Apr. 1994, pp. 7-14.

Bulletin 1013, "Pitot and Pitot-Static Probes", BFGoodrich (May 1998).

T.J. Rohloff, S.A. Whitmore and I. Catton, "Air Data Sensing from Surface Pressure Measurements Using a Neural Network Method", AIAA Journal, vol. 36 No. 11, Nov. 1998, pp. 2095-2101.

T.J. Rohloff, S.A. Whitmore and I. Catton, "Fault-Tolerant Neural Network Algorithm for Flush Air Data Sensing", Journal of Aircraft, vol. 36, No. 3, May-Jun. 1999, pp. 541-549.

T.J. Rohloff and I. Catton, "Fault Tolerance and Extrapolation Stability of a Neural Network Air-Data Estimator", Journal of Aircraft, vol. 36, No. 3, May-Jun. 1999, pp. 571-576.

"What is an Artificial Neural Network!", Battelle Memorial Institute (Copyright 1997), (Publication at least by Apr. 9, 2001), http://www.emsl.pnl.gov:2080/proj/neuron/neural/what.html.

C. Stergiou, "What is a Neural Network?", (Publication at least by Apr. 9, 2001), http://www.doc.ic.ac.uk/~nd/surprise_96/journal/vol1/cs11/article1.html.

D. Clark, "An Introduction to Neural Networks", Copyright 1991, 1997) (Publication at least by Apr. 9, 2001), http://members.home.net/neuralnet/introtonn/index.htm.

Truman M. Stickney, Marvin W. Shedlov and Donald I. Thompson, "Total Temperature Sensors, Technical Report 5755, Revision C", Rosemount Aerospace/BFGoodrich (Jan. 1994).

"Search Report Under Section 17" for Great Britain Application No. GB0519751.2.

"Search Report Under Section 17" for Great Britain Application No. GB0605207.0.

Sastry et al., C.V., "Failure Management Scheme for Use in a Flush Air Data," Aircraft Design 4, 2001, pp. 151-162.

* cited by examiner

FRONT VIEW

SIDE VIEW

US 7,379,839 B2

MULTI-FUNCTION AIR DATA PROBES EMPLOYING NEURAL NETWORKS FOR DETERMINING LOCAL AIR DATA PARAMETERS

BACKGROUND OF THE INVENTION

The present invention relates generally to air data sensing systems for use on an air vehicle. More particularly, the present invention relates to multi-function air data probes employed in an air data sensing system.

Air data systems that calculate the aerodynamic aircraft angle of attack (AOA) and angle of sideslip (AOS) of an air vehicle utilizing independent probes that are not pneumatically coupled, but which have processors for interchanging electrical signals between the probes, are known in the art. These probes are sometimes referred to as multi-function probes (MFPs). MFPs include processing circuitry located at the probe itself as part of its instrument package. With the help of the processing circuitry, MFPs are capable of converting pressure, measured by sensors included in the MFPs, into various useful local (to the probes) parameters, such as local AOA $\alpha_1$, local Mach number $M_1$ and local static pressure $P_{s1}$. These local parameters are utilized for the determination of aircraft AOA, aircraft AOS and other aircraft parameters including determination of altitude from static pressure or other means.

One current technique, used with MFPs, for determining the above-mentioned local parameters includes employing a multiple table lookup and interpolation scheme. Although this technique produces relatively accurate results, it is slow, requires the use of a relatively large amount of memory and is costly to implement. Further, it demonstrates a substantial degradation in performance when there are relatively large variations in the input measured pressure. Other current techniques likewise suffer from several of the above-mentioned disadvantages. Consequently, a faster, less expensive technique for determining local air data parameters, which can produce more robust results from noisy input data, would be a significant improvement in the art.

SUMMARY OF THE INVENTION

An air data sensing probe or MFP includes a barrel having multiple pressure sensing ports for sensing multiple pressures. Instrumentation coupled to the pressure sensing ports provides electrical signals related to the multiple pressures. A neural network, coupled to the instrumentation, receives as inputs the electrical signals related to the multiple pressures, and in response, the neural network provides, as an output, electrical signals indicative of at least one local air data parameter for the air data sensing probe.

BRIEF DESCRIPTION OF THE DRAWINGS

FIGS. 5-1 is a block diagram showing the neural network of FIG. 4 with two non-dimensional inputs.

FIGS. 5-2 is diagrammatic illustration of a 3-3-3 cascade neural network used to provide local air data parameters in accordance with an embodiment of the present invention.

FIGS. 5-3 is diagrammatic illustration of a 3-3-3 feed-forward neural network used to provide local air data parameters in accordance with an embodiment of the present invention.

FIGS. 5-4 is a block diagram showing multiple neural networks employed to obtain different local air data parameters in accordance with an embodiment of the present invention.

DETAILED DESCRIPTION OF THE PREFERRED EMBODIMENTS

Figure 1:
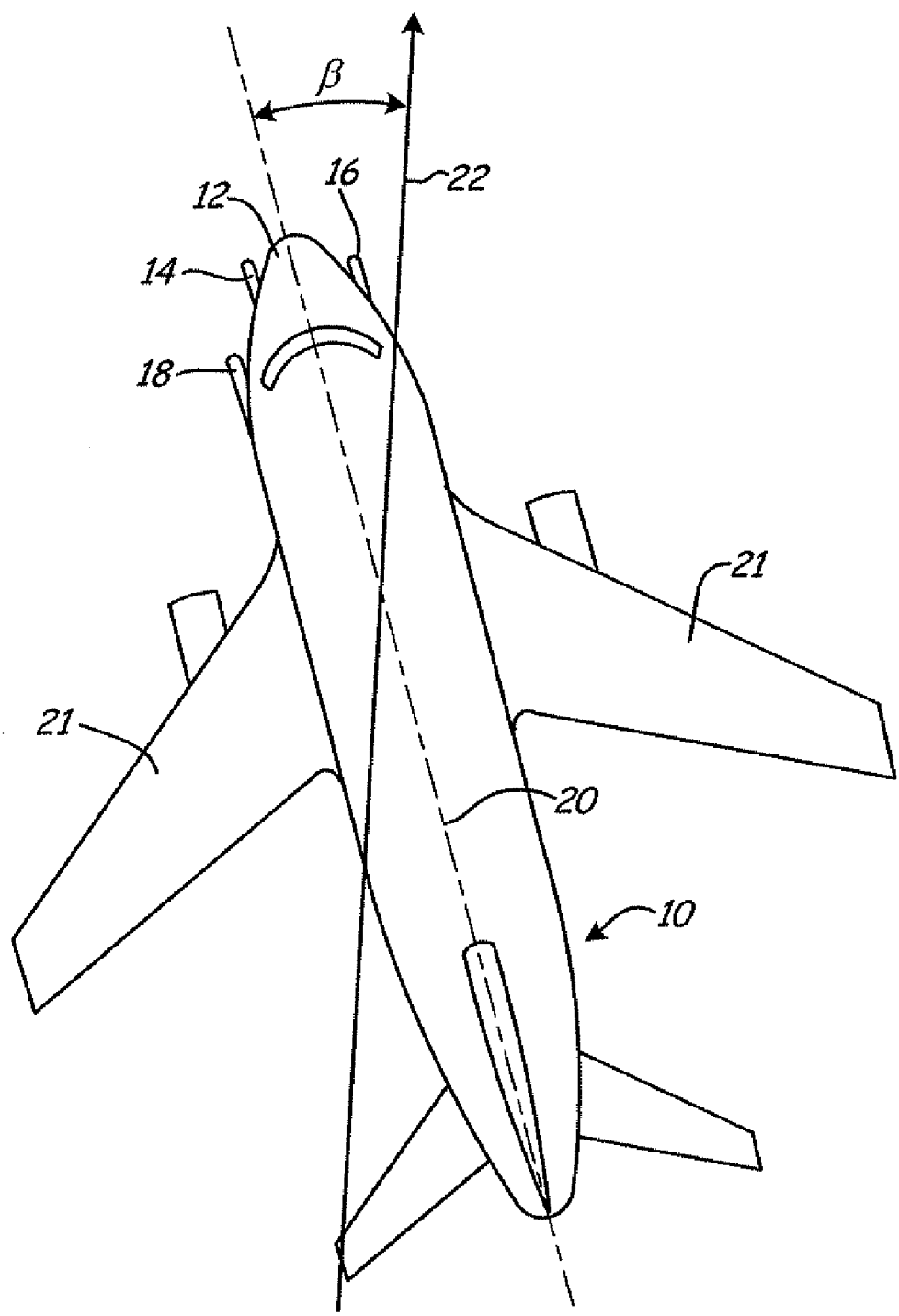
FIG. 1 is a top plan view of an aircraft illustrating a sideslip condition.

Referring to FIG. 1, an aircraft indicated generally at 10 is shown with a nose portion 12. Mounted air data sensing probes or MFPs are indicated schematically and generally at 14, 16 and 18. The positioning of aircraft 10 is with respect to a center plane or center line 20 that is perpendicular to the normal plane of the wings 21. Center line 20 is shown in a greatly exaggerated sideslip condition where the path of travel of aircraft 10 is indicated at 22, and where there is a substantial angle β between the path of travel line 22 and the line or plane 20. Angle β is the aircraft AOS, which is defined herein as an aircraft parameter. Other aircraft parameters or air data parameters include aircraft static pressure and Mach number, for example. The aircraft essentially is yawing to the left in FIG. 1. As the airflow passes across the aircraft, the probes 14 and 18 will be subjected to different local flow conditions, insofar as the local angle of wind and local static pressure is concerned, than is the probe 16.

Another aircraft parameter is the aircraft AOA. It also can be envisioned that if the aircraft changes angle of attack, because of the yaw angle, the amount of change in pressure on one side of the aircraft would be different than that on the other side of the aircraft. When the probes are only electrically connected together, there is no way of simply averaging these changes to obtain a correct static pressure reading. An angle of sideslip value can be used as a correction factor to compensate for this angle.

The above-mentioned aircraft parameters are determined from local air data parameters such as local AOA ($\alpha_1$), local Mach number ($M_1$), local static pressure ($P_{s1}$), and Pitot pressure ($P_t$) corrected for the effects of airspeed and local AOA which are typically computed for each of the MFPs 14, 16 and 18. Specifics regarding the arrangement of the MFPs of FIG. 1, circuitry integrally attached to the MFPs and the determination of local air data parameters are described below in connection with FIGS. 2 to 6. It must be noted that the present invention is not limited to three MFP systems, but can instead be used in systems utilizing any number of MFPs.

Figure 2A:
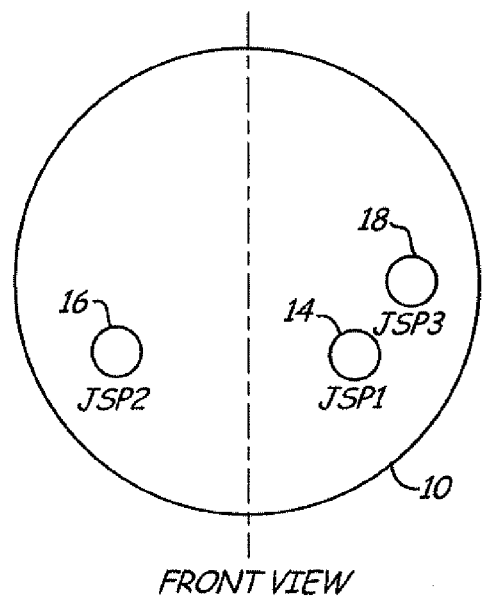
FIGS. 2A and 2B are a schematic cross sectional front representation and a schematic side view, respectively, of a nose portion of an aircraft showing placement of air data sensing probes, such as multi-function probes (MFPs), in one configuration.
Figure 2B:
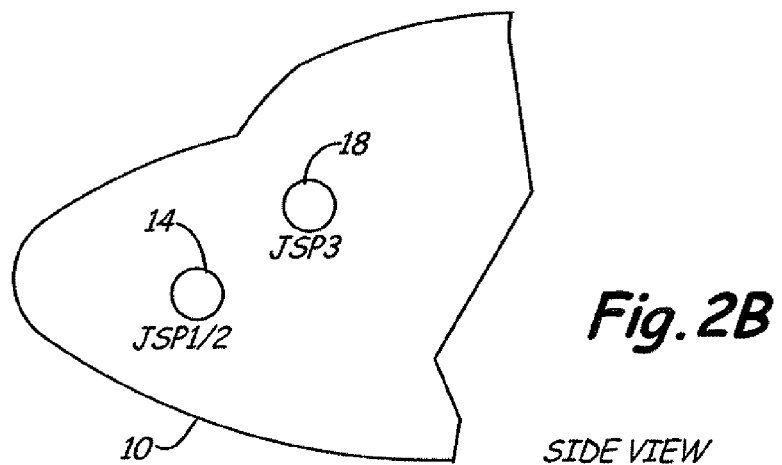

FIGS. 2A and 2B diagrammatically illustrate an arrangement of the MFPs 14, 16 and 18 shown in FIG. 1, from a front view and side view of the aircraft 10 for one example embodiment. These probes measure Pitot pressure $P_t$, and angle of attack pressures comprising $P\alpha_1$ and $P\alpha_2$, and calculate local parameters such as local AOA $\alpha_1$, local Mach number $M_1$, local static pressure $P_{s1}$ and Pitot pressure corrected for the effects of airspeed and local AOA.

As can be seen in FIG. 2A, probes 14 and 16 are symmetrically located, and are on the same "water line" or vertical height on the aircraft, so that they are in identical positions. Probe 18 is mounted on the same side of the aircraft as probe 14. This arrangement of MFPs helps provide for redundancy in correcting for sideslip of an aircraft arriving at air data parameters, such as aircraft AOA, static pressure or pressure attitude, and Mach number. Advantages of such a three-probe air data system and details regarding the compensation for aircraft AOS in such a system are set forth in U.S. patent application Ser. No. 09/851,289, filed May 8, 2001 and entitled "MULTI-FUNCTION AIR DATA PROBES USING NEURAL NETWORK FOR SIDESLIP COMPENSATION," U.S. patent application Ser. No. 09/851,485, filed May 8, 2001 and entitled "ITERATIVE METHOD OF AIRCRAFT SIDESLIP COMPENSATION FOR MULTI-FUNCTION PROBE AIR DATA SYSTEMS," U.S. patent application Ser. No. 09/850,863, filed May 8, 2001 and entitled "METHOD TO CALCULATE SIDESLIP ANGLE AND CORRECT STATIC PRESSURE FOR SIDESLIP EFFECTS USING INERTIAL INFORMATION," and U.S. patent application Ser. No. 09/850,796, filed May 8, 2001 and entitled "SIDESLIP CORRECTION FOR A MULTI-FUNCTION THREE PROBE AIR DATA SYSTEM," which are incorporated herein by reference in their entirety. However, the present invention is not limited to systems employing three MFPs, but instead can be used in systems employing a greater or lesser number.

An MFP or an air data probe is defined herein as a probe in which a computer or processing circuitry is integrally attached to the probe, and the sensing portions of the probe itself protrude into the airstream that moves past the aircraft skin. The processing circuitry is in an integrated housing immediately inside the skin. The outputs from the probes can include digital electrical signals representing pressures derived from sampling the pressure readings from internal pressure sensors. The internal pressure sensors of the probes can be either differential sensors or absolute sensors that receive the pressure signals and convert them into electrical signals that are then digitized. In accordance with the invention, the processing circuitry of an MFP (or other similar air data sensing probe) includes a neural network trained or configured to provide local air data parameters which are utilized for determining aircraft parameters, for example. The probes 14, 16 and 18 may be probes similar to those shown in the U.S. Pat. No. 4,378,696, or other similar patents. As shown schematically in FIG. 3, the probes have barrels 14A, 16A and 18A, with suitable ports for sensing Pitot pressure (or total pressure) Pt at leading ends of the probes indicated at 14B, 16B and 18B. The angle of attack sensing ports are placed on the top and bottom of the probes, and the top ports are illustrated schematically at 14C, 16C and 18C. Mating ports (14E, 16E and 18E not shown in FIG. 3) are on the lower portion, as is well known, for measuring the angle of attack by sensing the differentials in pressure between the upper port and the lower port relative to a change in local AOA. The lower angle of attack pressure port on the probes will sense a pressure designated $P\alpha_1$, and the upper angle of attack pressure ports shown at 14C, 16C and 18C sense a pressure designated $P\alpha_2$. Each of the probes 14, 16 and 18 is provided with a separate instrument housing 14D, 16D and 18D, respectively.

Figure 3:
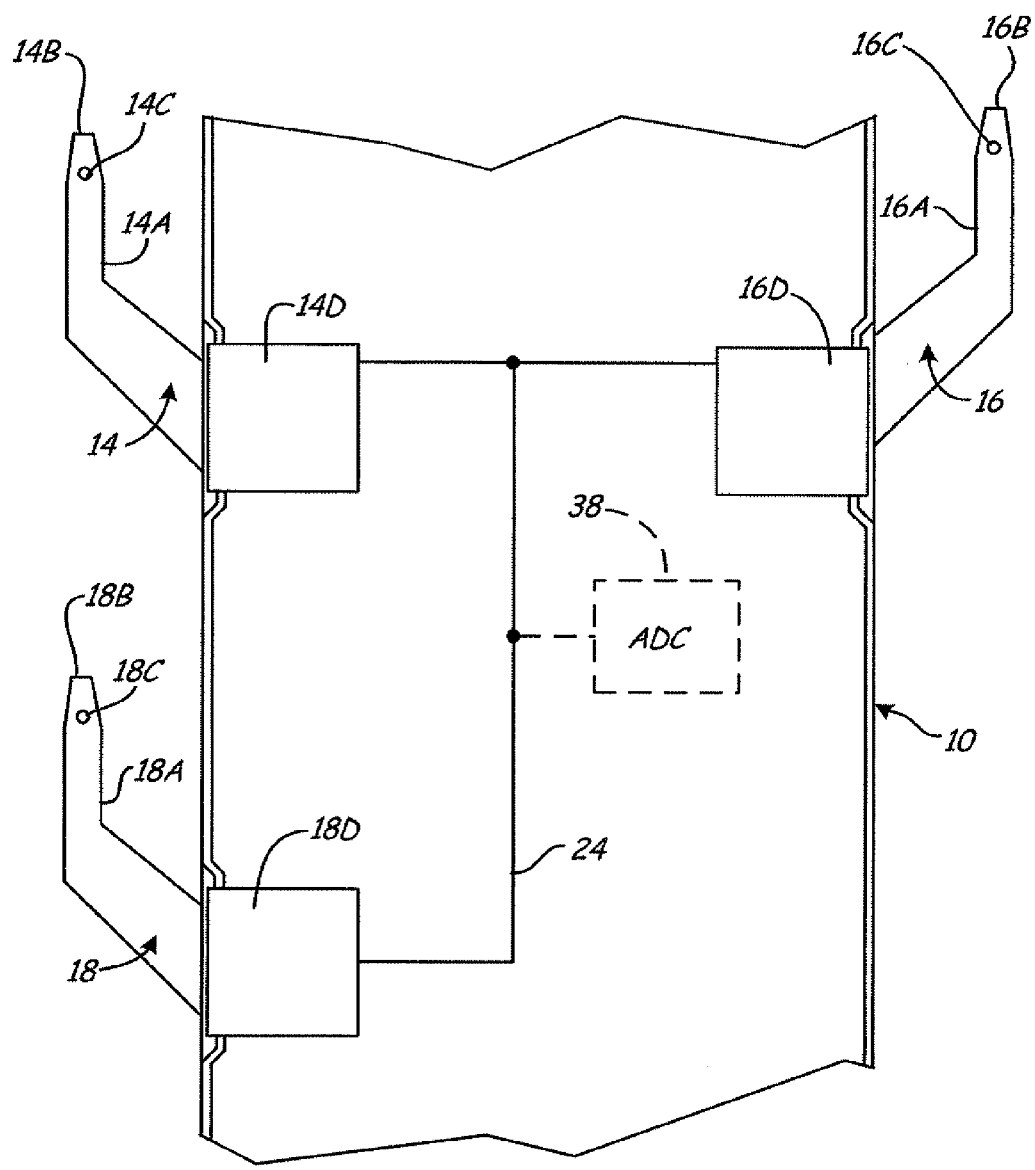
FIG. 3 is a schematic representation of a cross section of a nose portion of an aircraft showing placement of the MFPs.

As shown in FIG. 3, the electronics within instrument housings 14D, 16D and 18D are electrically coupled via electrical connection 24. Electrical connection 24 can be a data bus, electrical cables, or other types of communication pathways for communicating information in the form of electrical signals. In embodiments of the present invention, the neural networks, which are trained to provide local air data parameters, are implemented within the processing circuitry contained within the housings 14D, 16D and 18D associated with probes 14, 16 and 18. Also shown in FIG. 3 is an optional remote (air data computer) ADC 38 within which the neural networks used in the present invention can alternatively be implemented to calculate the local parameters for one or more of MFPs 14, 16 and 18.

Figure 4:
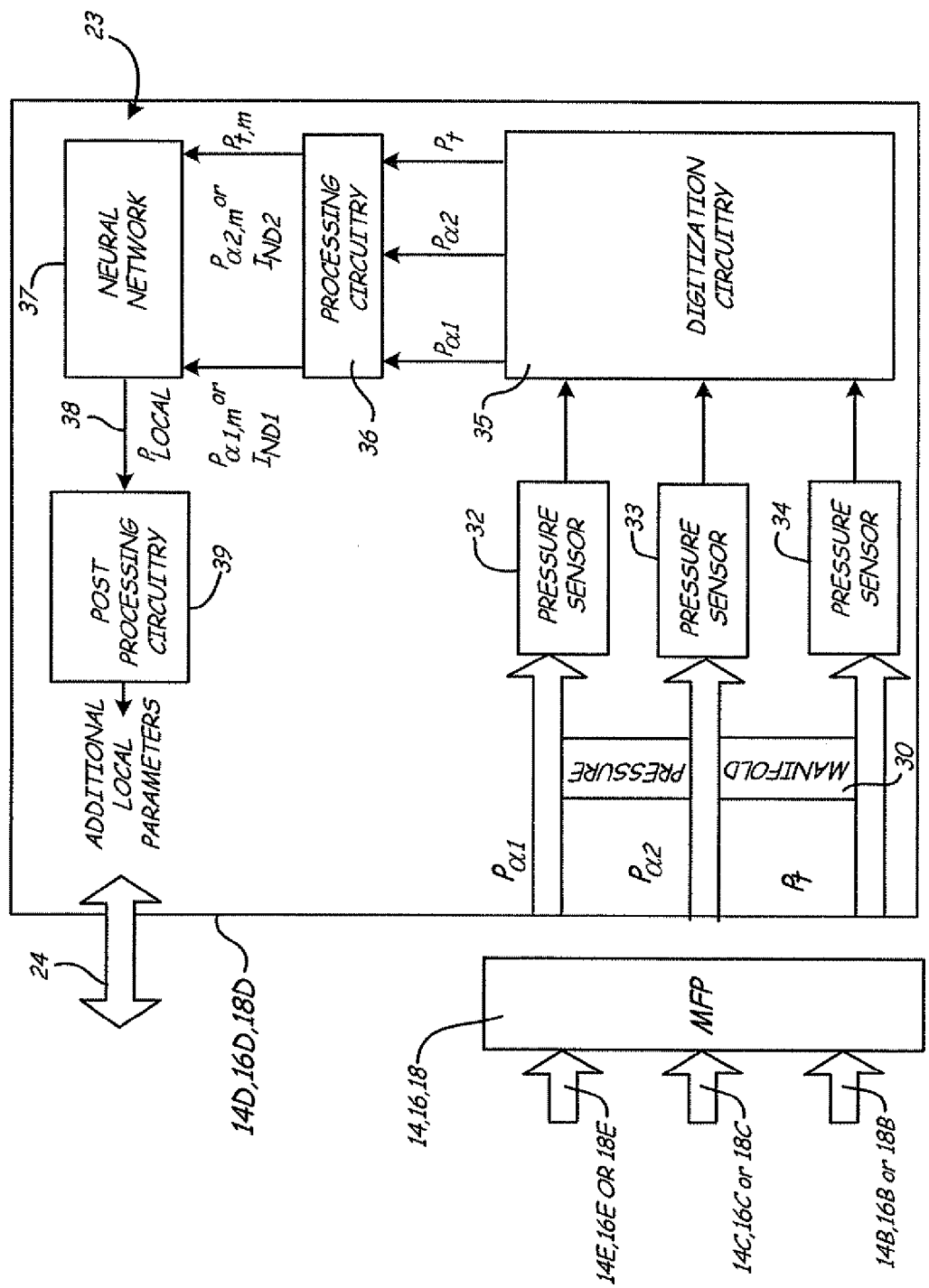
FIG. 4 is a block diagram illustrating circuitry of one of the probes, with the circuitry including a neural network in embodiments of the invention.

The arrangement of the circuitry in one example embodiment of an air data sensing probe of the invention is shown in block diagram form in FIG. 4. Since the circuitry integrally attached to each probe is substantially similar in some embodiments of the present invention, the circuitry shown can apply to any one of probes 14, 16 or 18. Circuitry 23 is shown schematically coupled to one of probes (14, 16 or 18) which are labeled as multi-function probes. Circuitry 23 is positioned within the corresponding housing 14D, 16D or 18D, and in the illustrated embodiment includes a neural network 37. Inputs are illustrated schematically as the $\alpha_1$ pressure port 14E, 16E or 18E, the $\alpha_2$ pressure port 14C, 16C or 18C, and the total pressure port 14B, 16B or 18B. The $\alpha_2$ pressure port and total pressure port correspond to those shown in FIG. 3 for probes 14, 16 and 18. The $\alpha_1$ pressure port corresponds to the lower port (not shown in FIG. 3) on the probes.

These pressures are transmitted through a manifold 30 to individual pressure sensors 32, 33 and 34, respectively. The outputs of pressure sensors 32, 33 and 34, which may be absolute pressure sensors or differential pressure sensors, are provided to analog-to-digital converter 35 for digitization. Electrical signals corresponding to pressures $P\alpha_1$, $P\alpha_2$ and $P_t$, are output from analog-to-digital converter 35. In accordance with the present invention, quantities related to the output from digitization circuitry 35, either in dimensional or non-dimensional form, are input to neural network 37, which is configured to accurately map the input quantities into desired output quantities (nondimensional local air data parameters $P_{LOCAL}$)

In embodiments of the present invention that utilize non-dimensional quantities as inputs to neural network 37, electrical signals corresponding to pressures $P\alpha_1$, $P\alpha_2$ and $P_t$, which are output from digitization circuitry 35, are provided to processing circuitry 36 resulting in measured pressures $P\alpha_{1,m}$, $P\alpha_{2,m}$ and $P_{t,m}$. Processing circuitry 36 can include a microcontroller and related memory and communications circuits all forming part of the MFP circuitry 23. Non-dimensionalization of the three pressure values ($P\alpha_{1,m}$, $P\alpha_{2,m}$ and $P_{t,m}$) is carried out within processing circuitry 36, to reduce the pressure values to independent parameters $I_{ND1}$ and $I_{ND2}$ Non-dimensional quantities $I_{ND1}$ and $I_{ND2}$ can then serve as inputs to neural network 37. Neural network 37 outputs nondimensional local air data parameters $P_{LOCAL}$ 38 as a function of quantities $I_{ND1}$ and $I_{ND2}$.

In one embodiment of the present invention, quantities $I_{ND1}$ and $I_{ND2}$ are equal to parameters $\pi_2$ and $\pi_3$, respectively, which are computed as:

$$\pi_2 = \frac{P_{\alpha 1,m} - P_{\alpha 2,m}}{P_{t,m} - \left[\frac{1}{2}(P_{\alpha 1,m} + P_{\alpha 2,m})\right]} \qquad \text{Equation 1}$$

and

-continued $$\pi_3 = \frac{\frac{1}{2}(P_{\alpha 1,m} + P_{\alpha 2,m})}{P_{t,m} - \left[\frac{1}{2}(P_{\alpha 1,m} + P_{\alpha 2,m})\right]}$$ Equation 2

With $\pi_2$ and $\pi_3$ as inputs, neural network-37 can output at 38 local air data parameters $P_{LOCAL}$ that include local AOA $\alpha_1$, local Mach number $M_1$ and a non-dimensional quantity $\pi_4$ in one example embodiment. Output quantity $\pi_4$ can be related to the local static pressure $P_{s1}$ according to:

$$\pi_4 = \frac{P_{sl}}{\left[\frac{1}{2}(P_{\alpha 1,m} + P_{\alpha 2,m})\right]}$$ Equation 3

Thus, the value of $P_{s1}$ can be easily obtained from Equation 3. The computation of additional local parameters, such as $P_{s1}$, is carried out by post processing circuitry 39.

In embodiments of the present invention that utilize dimensional quantities as inputs to neural network 37, pressures values $P\alpha_{1,m}$, $P\alpha_{2,m}$ and $P_{t,m}$, output by digitization circuitry 35, are input without non-dimensionalization into the neural network 37. In response, neural network 37 outputs local AOA $\alpha_1$, local Mach number $M_1$ and/or local static pressure $P_{s1}$ for the corresponding MFP. Thus, in such embodiments, processing circuitry 36 does not carry out the computation of non-dimensional input quantities $I_{ND1}$ and $I_{ND2}$, and is therefore optional. However, when dimensional input quantities are utilized, a minimum of three inputs ($P\alpha_{1,m}$, $P\alpha_{2,m}$ and $P_{t,m}$) to neural network 37 are required, instead of a minimum requirement of two inputs ($I_{ND1}$ and $I_{ND2}$) when non-dimensional quantities are utilized.

Although neural network 37 is shown as a separate block in FIG. 4, neural network 37 can be implemented as a computer program that is stored and executed in processing circuitry 36. Further, the MFP circuitry can also include other circuits and devices such as electromagnetic filters for reducing EMI interference, heater control circuits, and power supplies. Circuitry 23 also includes, and/or is coupled to, data bus 24 for receiving information from, or transmitting information to, other probes or devices in the system.

Neural network 37 can be any of a number of known neural network architectures. For example, neural network 37 can be a feed-forward architecture, a cascade architecture, a three-layer architecture, or other types of neural networks. Typically, the neural network architecture is first chosen with the required number of inputs and outputs (for example two inputs $\pi_2$ and $\pi_3$ and three outputs $\alpha_1$, $M_1$ and $\pi_4$) Neural network 37 is next trained using a data set of inputs and ideal target outputs spanning the expected operating range of values. This data set can be, for example, experimental data correlating various inputs to their corresponding outputs. The experimental data can be obtained using wind tunnel testing, flight testing, or by other methods. Once trained, neural network 37 is a deterministic algorithm consisting of weighted sums and transfer functions interconnected in series and/or parallel. It can then be used to map the probe inputs to the desired outputs.

Figures 1, 5:
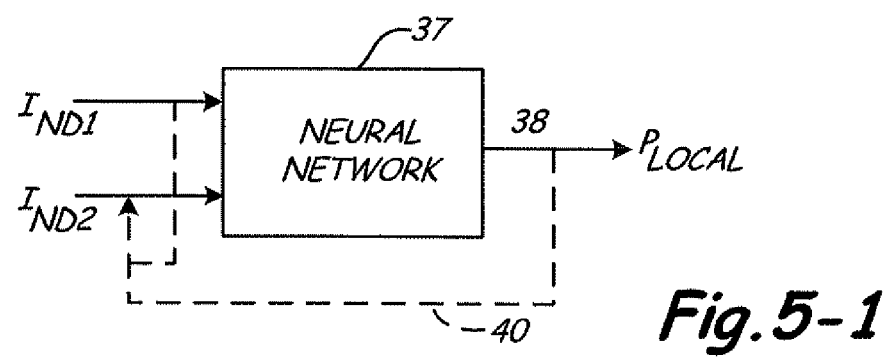
Figures 4, 5:
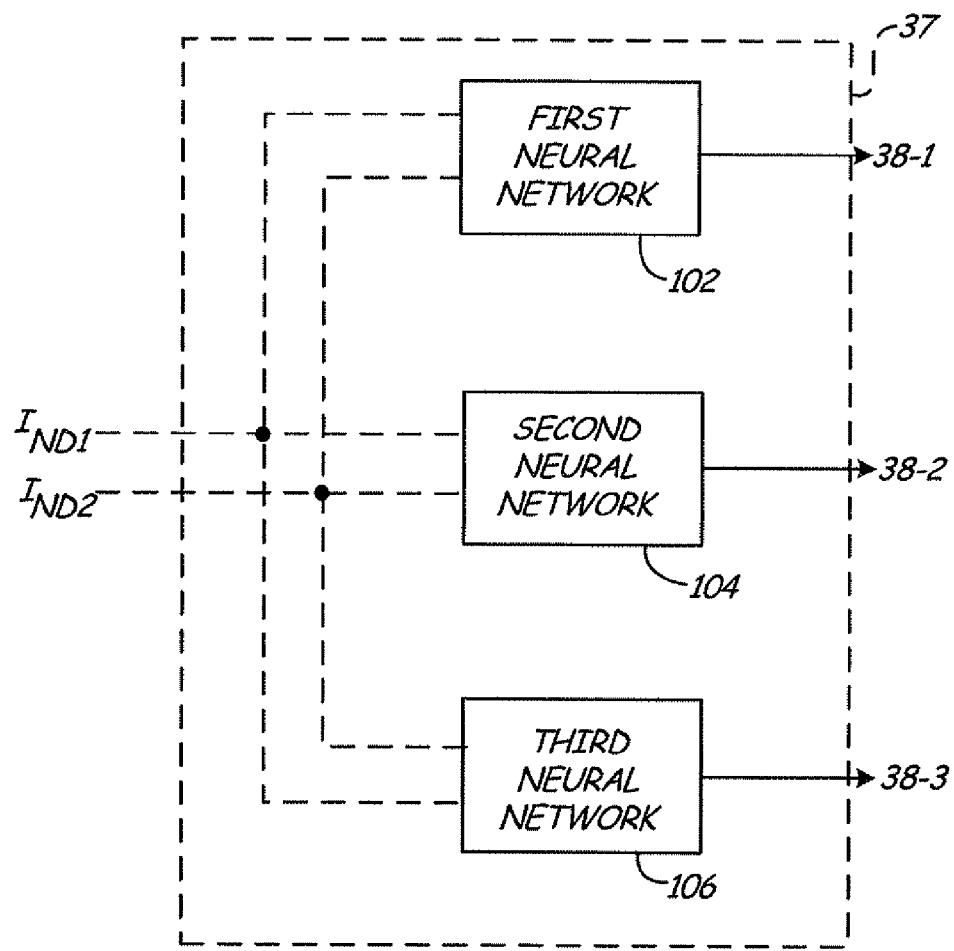

FIGS. 5-1 is a block diagram showing neural network 37 receiving two non-dimensional inputs $I_{ND1}$ and $I_{ND2}$ as described above, and providing local air data parameters 38 as outputs. Also included in FIGS. 5-1, is an optional feedback path 40. In embodiments of the present invention that employ static neural networks, feedback path 40 is excluded. However, embodiments that employ adaptive neural networks include feedback path 40. Also, although shown externally to neural network 37, feedback path 40 can be considered to be internal to the neural network since neural networks are frequently implemented in a processor environment. Details of different embodiments of neural network 37 are provided further below in connection with FIGS. 5-2 through 5-4.

In general, separate neural networks can be developed based on training data for a number of appropriate local air data parameters including, but not limited to local AOA $\alpha_1$, local Mach number $M_1$ and a nondimensional parameter related to local static pressure $P_{s1}$. Artificial neural networks are computer programs that simulate biological neural networks. Artificial neural networks such as neural network 37 are unlike artificial intelligence programs in that, instead of using deductive reasoning to apply known rules to situations to produce outputs, artificial neural networks automatically construct associations based upon the results of known situations (i.e., combinations of inputs and outputs). In training, neural networks such as neural network 37 automatically adjust themselves and eventually generalize associations.

Figures 2, 5:
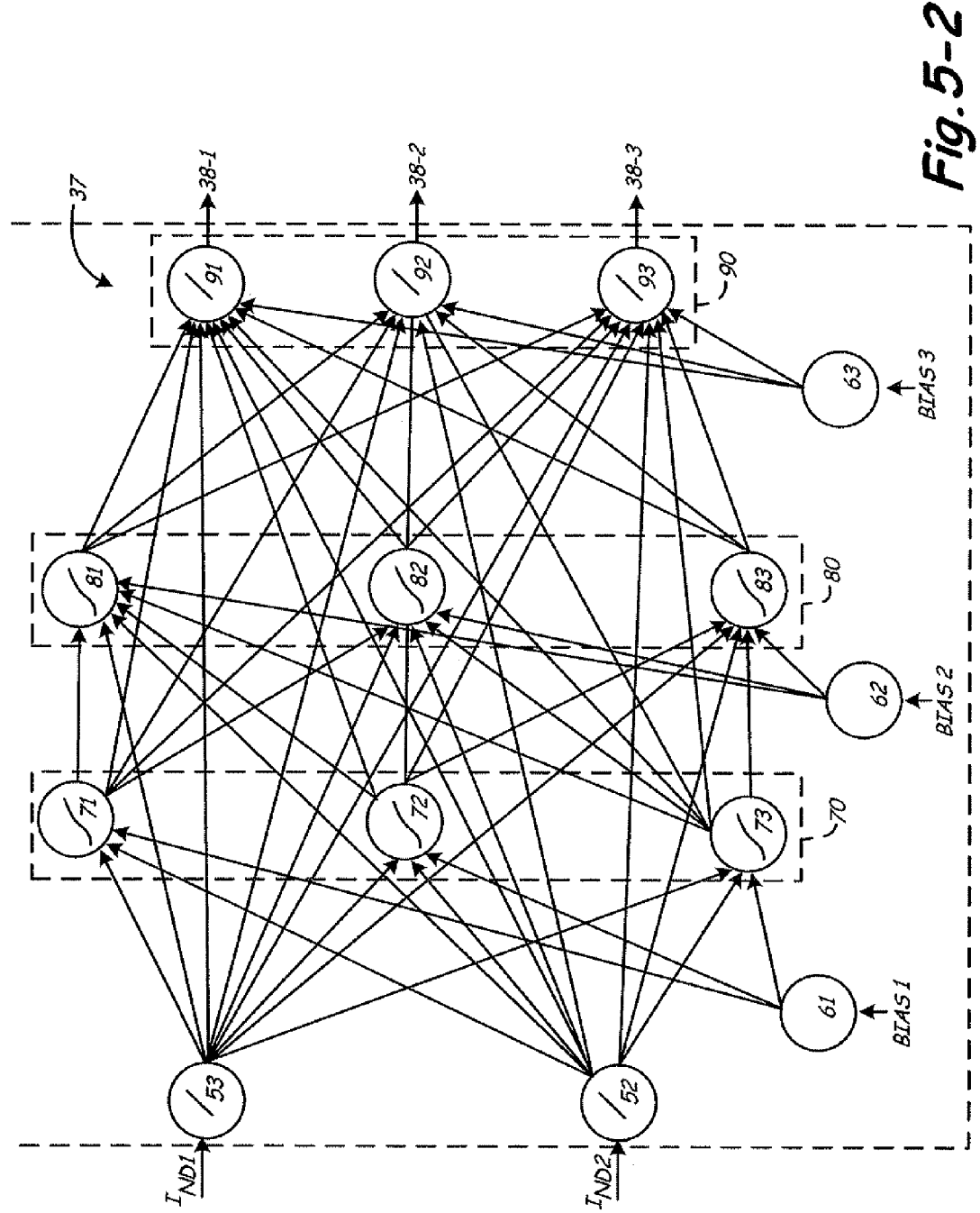
Figures 3, 5:
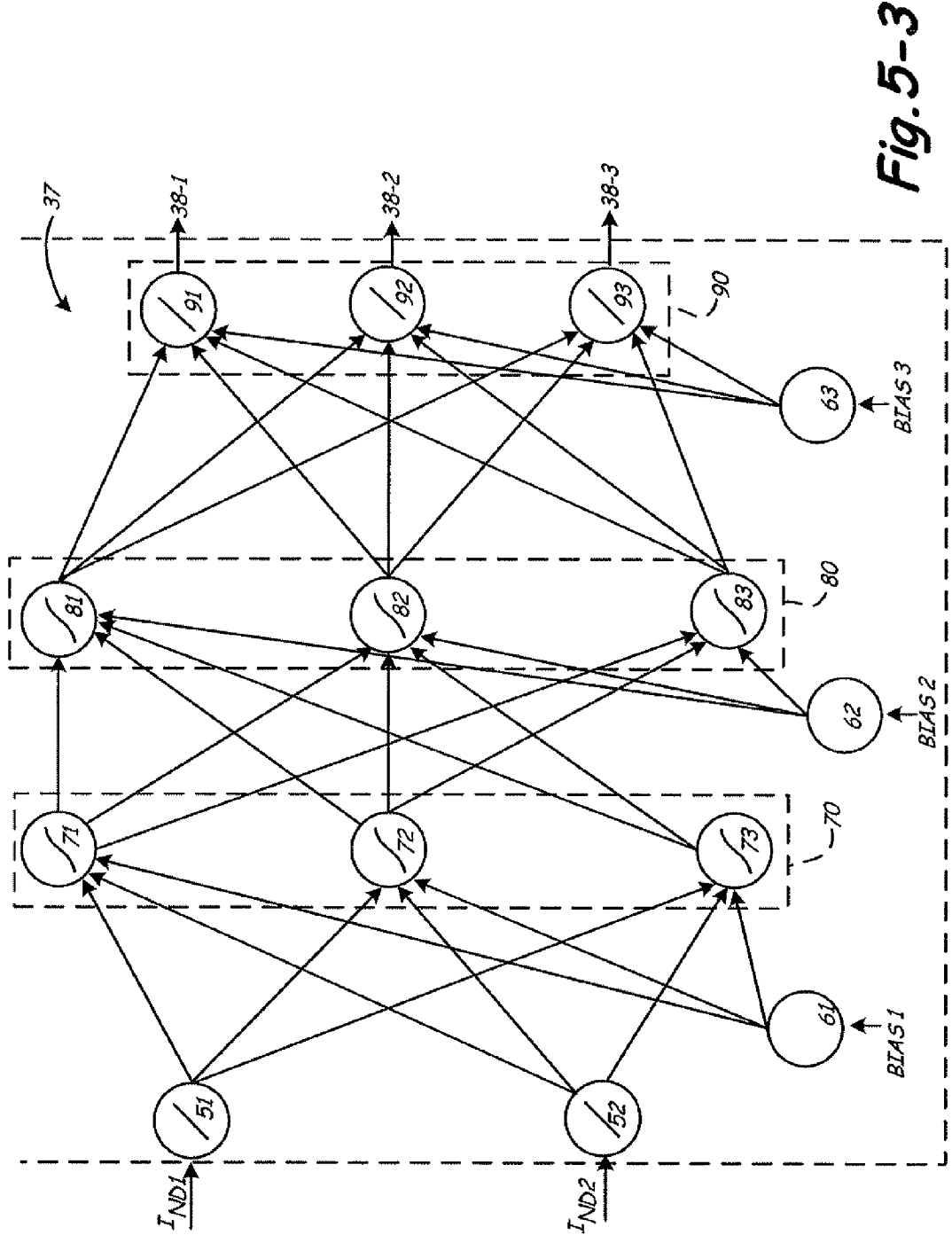

Once neural network 37 is constructed and trained (by being presented with historical cause and effect situations) in a wind tunnel simulation, using other simulated data, or flight test data, the network 37 then shapes itself to build an internal representation of the governing rules. Later, after artificial neural network 37 is trained and is in use in one of the air data probes, it can be presented with various combinations of inputs to produce a real event result. In other words, neural network 37 will be trained to produce particular local air data parameter values at output(s) 38 in response to specific combinations of Pitot pressure $P_t$, and angle of attack pressures comprising $P\alpha_1$ and $P\alpha_2$ and/or dimensional and non-dimensional form. Shown in FIGS. 5-2 is a 3-3-3 neural network (i.e., a three-layered neural network with three nodes in the first, second, and third layers) used to provide local air data parameters 38-1, 38-2 and 38-3. The illustration is not intended to limit the invention to any particular type of neural network, nor to the number of inputs or layers of the neural network. As illustrated in FIGS. 5-2, inputs $I_{ND1}$ and $I_{ND2}$, to neural network 37, are provided to input nodes 51 and 52, respectively. The outputs of each of the input nodes is then provided to each of threshold gates or nodes 71, 72, and 73 in first network layer 70 of neural network 37. In turn, the outputs of each of these threshold gates are provided to each of threshold gates 81, 82 and 83 in second network layer 80 of network 37. Further, outputs from each of the threshold gates of second network layer 80 are provided to each of gates 91, 92 and 93 of third network layer 90, which in turn provides nondimensional local air data parameters 38-1, 38-2 and 38-3 as outputs.

A bias ($BIAS_1$) is provided to each of the threshold gates of first network layer 70 from bias node 61. Similarly, biases $BIAS_2$ and $BIAS_3$ are provided to each of the threshold gates of the second and third network layers 80 and 90 from bias nodes 62 and 63, respectively. Different types of transfer functions can be employed at each threshold gate to provide appropriate gate outputs. For example, a hyperbolic tangent (tanh) transfer function, which is a "squashing" function that takes inputs ranging from $-\infty$ to $+\infty$ and outputs a corresponding value between $-1$ and $+1$, can be applied to the inputs at each threshold gate of layers 70 and 80, to produce corresponding intermediate gate outputs. Further, a linear transfer function, which simply outputs the input value, can be applied to the inputs at each threshold gate of third layer 90, to produce local air data parameters 38-1, 38-2 and 38-3.

FIGS. 5-3 shows a 3-3-3 neural network that is substantially similar to the neural network of FIG. 5-2. The same reference numerals are used to represent the same or similar elements in FIGS. 5-2 and 5-3. The example neural network shown in FIGS. 5-2, and described above, is a cascade neural network (i.e., the upstream nodes influence multiple network layers). Therefore, in the embodiment of FIGS. 5-2, upstream nodes 51 and 52 influence network layers 70, 80 and 90 and nodes 71, 72 and 73 influence network layers 80 and 90. However, the neural network shown in FIGS. 5-3 is merely a feed forward neural network (i.e., the upstream nodes do not influence multiple network layers). Therefore, in the embodiment of FIGS. 5-3, upstream nodes 51 and 52 only influence network layer 70, nodes 71, 72 and 73 only influence network layer 80, etc. In other respects, the neural networks of FIGS. 5-2 and 5-3 are substantially similar in structure and operation.

In the example embodiments of the present invention described above in connection with FIGS. 5-1 and 5-2, a single neural network is employed to obtain multiple local air data parameters 38-1, 38-2 and 38-3.

In the embodiment shown in FIGS. 5-4, multiple neural networks are employed, with each neural network of the multiple neural networks outputting a different local air data parameter as a function of inputs $I_{ND1}$ and $I_{ND2}$. Thus, first neural network 102 outputs local air data parameter 38-1, second neural network 104 outputs air data local parameter 38-2 and third neural network 106 outputs local air data parameter 38-3.

There are a wide variety of training schemes, which are aimed at minimizing the neural network output error. One such technique suitable for use with the networks of FIGS. 5-1 through 5-4 is the Levenberg-Marquardt back-propagation scheme. In general, this training technique involves recursively nudging the network weight values toward a solution that minimizes the mean absolute error between the network output and the target output.

Figure 6:
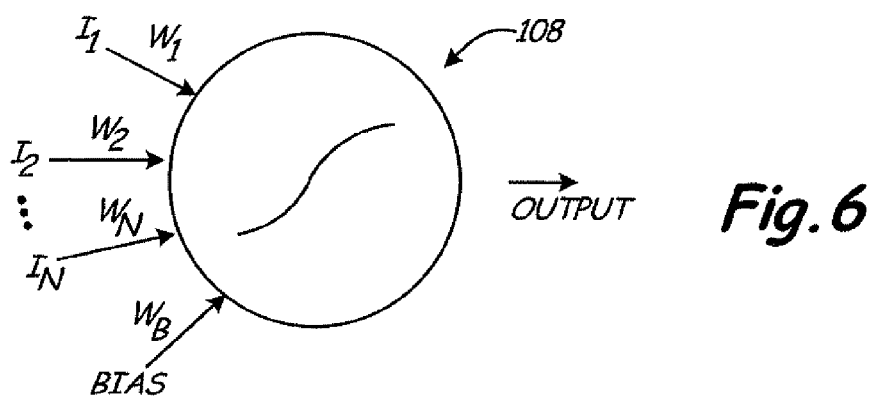
FIG. 6 is a diagrammatic illustration of a node or threshold gate of the neural network.

FIG. 6 illustrates a plurality of separate weights ($W_1$, $W_2$, ..., $W_N$ and $W_B$) applied to a node or threshold gate 108 of a neural network (such as 37). Also illustrated is a bias (BIAS) which is associated with gate or node 108. In general, each node in the neural network can have its own unique bias as well as its own unique set of weights applied to its inputs. The gate output is determined as a function of the inputs ($I_1$, $I_2$, ... $I_N$), the weights, the bias, and the transfer function.

In one embodiment of the present invention, the gate output is determined by the relation:

$$\text{Gate Output} = \tanh(\text{Bias} \times W_B + \Sigma[I_K \times W_K]) \quad \text{Equation 4}$$

Here, an arbitrary number of inputs ($I_1$, $I_2$, ... $I_N$) and a Bias are each multiplied by corresponding weights ($W_1$, $W_2$, ..., $W_N$ and $W_B$) and summed. This sum is then passed through a transfer (in this case a hyperbolic tangent) function, to produce the gate output. The inputs can be from the neural network inputs and/or outputs of other gates. In one embodiment employing Equation 4 to determine the gate output, a single Bias with a constant value of 1 can input to each gate, such that $\text{Bias} \times W_B = W_B$ and represents an arbitrary constant to each gate.

Although the present invention has been described with reference to preferred embodiments, workers skilled in the art will recognize that changes may be made in form and detail without departing from the spirit and scope of the invention. For example, the present invention includes the use of a neural network in this manner in other types of MFPs. Therefore, the phrases "air data probes" and "MFPs" should also be interpreted to include any type of MFP capable of delivering local Mach number, local angle of attack, and/or local static pressure. Further, while FIGS. 5-1 through 5-4 illustrate neural networks with two non-dimensional inputs $I_1$ and $I_2$, the invention includes MFPs utilizing a neural network having an appropriate number of dimensional inputs, for example $P_{\alpha1,m}$, $P_{\alpha2,m}$ and $P_{t,m}$. The number and type of dimensional or non-dimensional inputs and outputs can be changed without departing from the spirit and scope of the invention.

What is claimed is:

1. An air data sensing probe comprising:
   a plurality of pressure sensing ports sensing a plurality of pressures;
   instrumentation coupled to the plurality of pressure sensing ports providing electrical signals related to the plurality of pressures; and
   a neural network coupled to the instrumentation, the neural network configured to receive as inputs the electrical signals related to the plurality of pressures, and in response, the neural network configured to provide as an output electrical signals indicative of at least one local air data parameter for the air data sensing probe.

2. The air data sensing probe of claim 1, wherein the electrical signals related to the plurality of pressures are indicative of dimensional pressure values corresponding to separate ones of the sensed plurality of pressures.

3. The air data sensing probe of claim 2, wherein a number of dimensional pressure values that the neural network is configured to receive as inputs is at least three.

4. The air data sensing probe of claim 1, wherein the electrical signals related to the plurality of pressures are indicative of non-dimensional quantities obtained as a result of non-dimensionalization of at least some of the plurality of pressures.

5. The air data sensing probe of claim 4, wherein a number of non-dimensional quantities that the neural network is configured to receive as inputs is at least two.

6. The air data sensing probe of claim 1, wherein the plurality of pressure sensing ports include first and second angle of attack sensing ports for sensing first and second angle of attack pressures $P\alpha_1$ and $P\alpha_2$, respectively, and wherein the electrical signals related to the plurality of pressures include electrical signals indicative of the first and second angle of attack pressures $P\alpha_1$ and $P\alpha_2$.

7. The air data sensing probe of claim 6, wherein the plurality of sensing ports include a Pitot sensing port for sensing a Pitot pressure $P_t$, and wherein the electrical signals related to the plurality of pressures include electrical signals indicative of the Pitot pressure $P_t$.

8. The air data sensing probe of claim 7, wherein the neural network is configured to provide, as the output, electrical signals indicative of a local Mach number $M_1$ for the air data sensing probe.

9. The air data sensing probe of claim 7, wherein the neural network is configured to provide as the output electrical signals indicative of a local angle of attack $\alpha_1$ for the air data sensing probe.

10. The air data sensing probe of claim 7, wherein the neural network is configured to provide as the output electrical signals indicative of local static pressure $P_1$ for the air data sensing probe.

11. The air data sensing probe of claim 7, wherein the neural network is configured to provide as the output electrical signals indicative of a non-dimensional quantity related to local static pressure $P_{s1}$ for the air data sensing probe.

12. The air data sensing probe of claim 1, and further comprising a barrel having the plurality of pressure sensing ports.

13. The air data sensing probe of claim 1 wherein the neural network is a static neural network.

14. The air data sensing probe of claim 1 wherein the neural network is an adaptive neural network.

15. The air data sensing probe of claim 1 wherein the neural network is a cascade neural network.

16. The air data sensing probe of claim 1 wherein the neural network is a feed-forward network.

17. The air data sensing probe of claim 1 wherein the neural network is single neural network configured to provide electrical signals indicative of a plurality of local air data parameters for the air data sensing probe.

18. The air data sensing probe of claim 1 wherein the neural network comprises a plurality of single neural networks, each single neural network of the plurality of single neural networks configured to provide an electrical signal indicative of a different one of a plurality of local air data parameters for the air data sensing probe.

19. An air data sensing probe comprising:
pressure sensing means for sensing a plurality of pressures;
electrical signal generating means for providing electrical signals related to the plurality of pressures; and
neural network means coupled to the electrical signal generating means for receiving as inputs the electrical signals related to the plurality of pressures, and for providing in response electrical signals indicative of at least one local air data parameter for the air data sensing probe.

20. The air data sensing probe of claim 19, wherein the electrical signals generated by the electrical signal generating means are indicative of dimensional pressure values corresponding to separate ones of the sensed plurality of pressures.

21. The air data sensing probe of claim 19, wherein a number of dimensional pressure values that the neural network means receives as inputs is at least three.

22. The air data sensing probe of claim 19, wherein the electrical signals generated by the electrical signal generating means are indicative of non-dimensional quantities obtained as a result of non-dimensionalization of at least some of the plurality of pressures.

23. The air data sensing probe of claim 22, wherein a number of non-dimensional quantities that the neural network means receives as inputs is at least two.

24. The air data sensing probe of claim 19, wherein the pressure sensing means includes a barrel having a plurality of pressure sensing ports.

25. A method comprising:
sensing a plurality of pressures in an air data sensing probe;
providing electrical signals related to the plurality of pressures;
receiving, in a neural network, the electrical signals related to the plurality of pressures sensed in the air data sensing probe; and
utilizing the neural network to provide output electrical signals indicative of at least one local air data parameter for the air data sensing probe.

* * * * *